(12) United States Patent
Tomlinson et al.

(10) Patent No.: US 12,288,893 B2
(45) Date of Patent: Apr. 29, 2025

(54) ENCLOSURE SEAL SYSTEM AND SEALING METHOD

(71) Applicant: Ford Global Technologies, LLC, Dearborn, MI (US)

(72) Inventors: Samuel J. Tomlinson, Farmington Hills, MI (US); Thomas E. Smith, Livonia, MI (US); Kimberly Ann Lazarz, Ypsilanti, MI (US); Zachary Schultz, Rushville, IN (US)

(73) Assignee: Ford Global Technologies, LLC, Dearborn, MI (US)

(*) Notice: Subject to any disclaimer, the term of this patent is extended or adjusted under 35 U.S.C. 154(b) by 605 days.

(21) Appl. No.: 17/706,752

(22) Filed: Mar. 29, 2022

(65) Prior Publication Data
US 2023/0318112 A1 Oct. 5, 2023

(51) Int. Cl.
| H01M 50/262 | (2021.01) |
| H01M 50/209 | (2021.01) |
| H01M 50/224 | (2021.01) |
| H01M 50/244 | (2021.01) |
| H01M 50/249 | (2021.01) |
| H01M 50/276 | (2021.01) |

(52) U.S. Cl.
CPC ....... *H01M 50/262* (2021.01); *H01M 50/209* (2021.01); *H01M 50/224* (2021.01); *H01M 50/244* (2021.01); *H01M 50/249* (2021.01); *H01M 50/276* (2021.01); *H01M 2220/20* (2013.01)

(58) Field of Classification Search
None
See application file for complete search history.

(56) References Cited

U.S. PATENT DOCUMENTS

| 2012/0114999 | A1* | 5/2012 | Park | H01M 50/24 |
| | | | | 429/99 |
| 2018/0175351 | A1* | 6/2018 | Kim | H01M 50/262 |
| 2020/0052252 | A1 | 2/2020 | Smith et al. | |
| 2020/0402730 | A1* | 12/2020 | Wakinaka | H01M 50/249 |

FOREIGN PATENT DOCUMENTS

| CN | 201541412 U | * | 8/2010 |
| CN | 202006722 U | | 10/2011 |
| CN | 206610851 U | | 11/2017 |
| CN | 207052642 U | | 2/2018 |
| CN | 208336311 U | * | 1/2019 |
| CN | 210006796 U | * | 1/2020 |
| CN | 210156449 U | | 3/2020 |
| CN | 214542379 U | | 10/2021 |
| DE | 102018211473 B3 | | 9/2019 |

OTHER PUBLICATIONS

Machine Translation of CN-210006796-U (Year: 2020).*
Abstract of CN-201541412-U (Year: 2010).*
Abstract of CN-208336311-U (Year: 2019).*

* cited by examiner

*Primary Examiner* — Gregg Cantelmo
(74) *Attorney, Agent, or Firm* — David B. Kelley; Carlson, Gaskey & Olds, P.C.

(57) ABSTRACT

A battery enclosure assembly includes first and second pieces of an enclosure having an interior area, a plurality of fasteners joining the first and second pieces at a fastening interface, and a seal system sealing the first and second pieces at a sealing interface that is outside the plurality of fasteners relative to the interior area. The seal system including a cured gasket and a non-setting sealant.

18 Claims, 3 Drawing Sheets

ENCLOSURE SEAL SYSTEM AND SEALING METHOD

TECHNICAL FIELD

This disclosure relates generally to sealing a traction battery enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. The traction battery can include an enclosure for housing the battery arrays.

SUMMARY

In some aspects, the techniques described herein relate to a battery enclosure assembly, including: first and second pieces of an enclosure having an interior area; a plurality of fasteners joining the first and second pieces at a fastening interface; and a seal system sealing the first and second pieces at a sealing interface that is outside the plurality of fasteners relative to the interior area, the seal system including a cured gasket and a non-setting sealant.

In some aspects, the techniques described herein relate to a battery enclosure assembly, further including at least one array of battery cells disposed within the interior area.

In some aspects, the techniques described herein relate to a battery enclosure assembly, wherein the cured gasket is a cure-in-place gasket.

In some aspects, the techniques described herein relate to a battery enclosure assembly, wherein the cured gasket is bonded to the first piece and compressed against the second piece.

In some aspects, the techniques described herein relate to a battery enclosure assembly, wherein the first piece is an enclosure cover of a battery enclosure, and the second piece is an enclosure tray of the battery enclosure.

In some aspects, the techniques described herein relate to a battery enclosure assembly, wherein the non-setting sealant is applied to the enclosure tray.

In some aspects, the techniques described herein relate to a battery enclosure assembly, further including a sealant collection channel provided within the tray, the sealant collection channel disposed between the sealing interface and the fastening interface.

In some aspects, the techniques described herein relate to a battery enclosure assembly, wherein the fastening interface and the sealing interface each extend circumferentially continuously about the interior area such that the fastening interface and the sealing interface each completely encircle the interior area.

In some aspects, the techniques described herein relate to a battery enclosure assembly, wherein the cured gasket completely encircles the fastening interface.

In some aspects, the techniques described herein relate to a battery enclosure assembly, further including a plurality of fastener seals, each fastener within the plurality of fasteners extending through one of the plurality of fastener seals.

In some aspects, the techniques described herein relate to a battery enclosure assembly, wherein the fastener seals are washer seals.

In some aspects, the techniques described herein relate to a battery enclosure assembly, wherein the plurality of fasteners extend through the fastening interface.

In some aspects, the techniques described herein relate to a battery enclosure assembly, wherein the first piece, the second piece, or both are a metal or metal alloy.

In some aspects, the techniques described herein relate to an enclosure securing method, including: joining together first and second enclosure pieces of an enclosure at a fastening interface using a plurality of fasteners that extend through the fastening interface; and during the joining, compressing a cured gasket between the first and second enclosure pieces, the cured gasket compressed against a non-setting sealant to provide a sealing interface, the sealing interface outside the fastening interface relative to an interior area of the enclosure.

In some aspects, the techniques described herein relate to an enclosure securing method, wherein the compressing is at a position outside of the interface relative to the interior area.

In some aspects, the techniques described herein relate to an enclosure securing method, further including encircling the interior area with the cured gasket.

In some aspects, the techniques described herein relate to an enclosure securing method, further including curing the cured gasket in place on one of the first or second enclosure piece.

In some aspects, the techniques described herein relate to an enclosure securing method, further including holding some of the non-setting sealant within a sealant collection channel.

In some aspects, the techniques described herein relate to an enclosure securing method, wherein the sealant collection channel is between the fastening interface and the sealing interface.

In some aspects, the techniques described herein relate to an enclosure securing method, further including holding at least one array of battery cells within the interior area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure generally relates to sealing a battery pack enclosure. In particular, the disclosure details sealing the interface with a cured seal and a non-setting sealant. If areas of the battery pack enclosure are metal or a metal alloy, the non-setting sealant can help to reduce corrosion.

Figure 1:
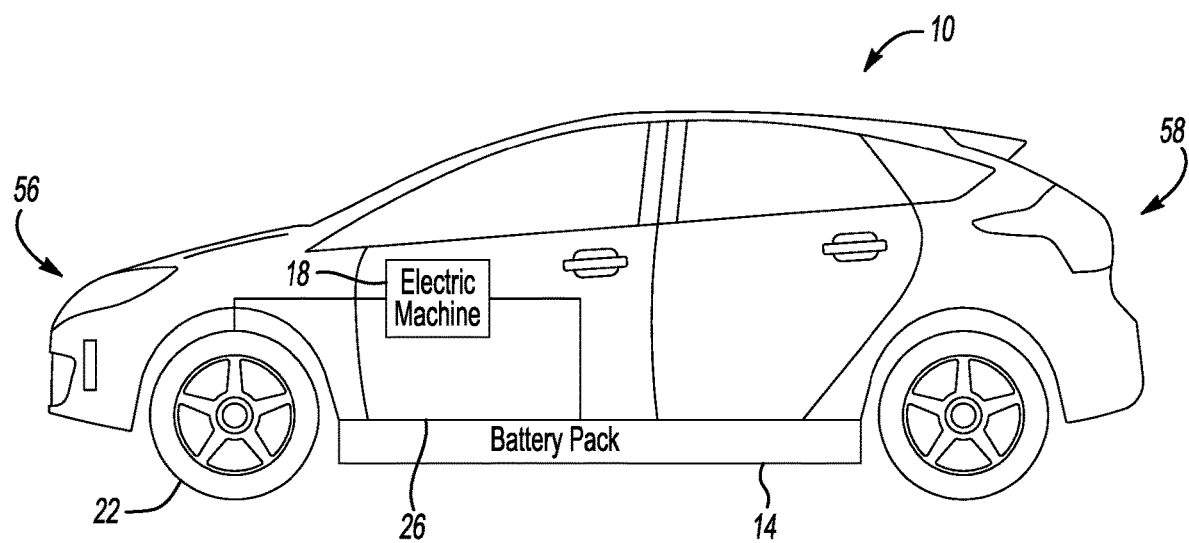
FIG. 1 illustrates a schematic view of a powertrain of an electrified vehicle.

With reference to FIG. 1, an electrified vehicle 10 includes a traction battery pack 14 and an electric machine 18, and wheels 22. The battery pack 14 powers an electric machine 18, which converts electric power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
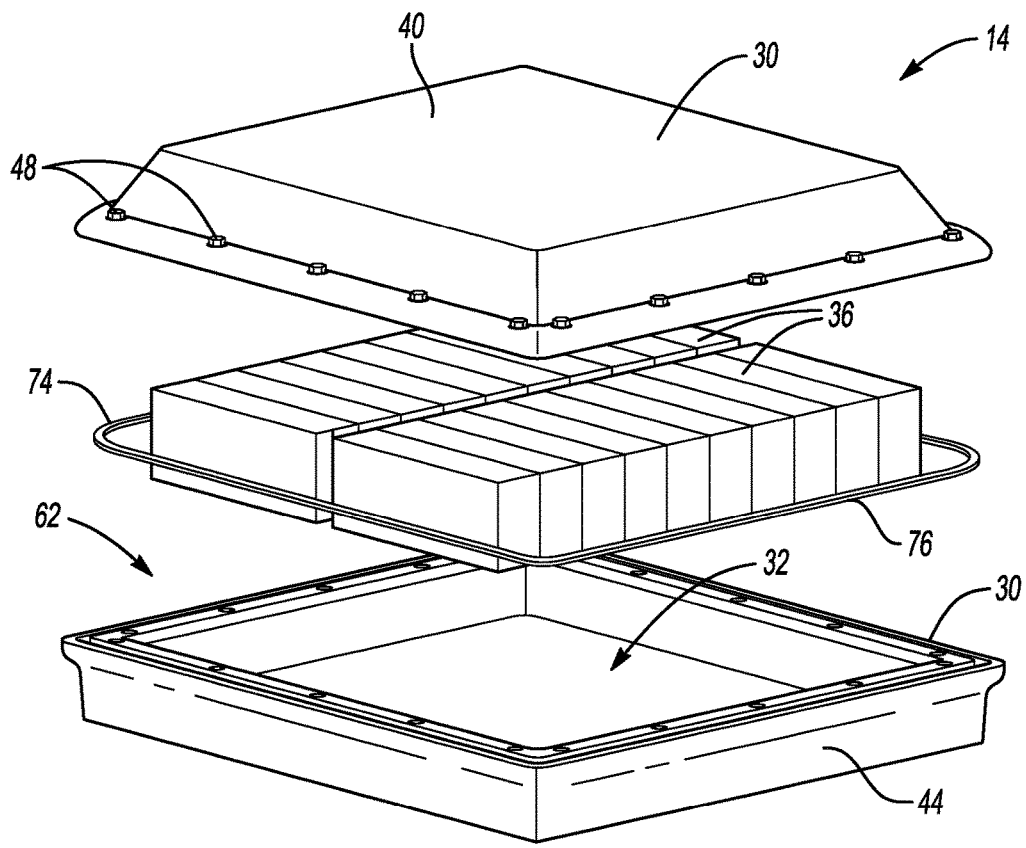
FIG. 2 illustrates an expanded view of selected portions of a battery pack from the powertrain of FIG. 1.
Figure 3:
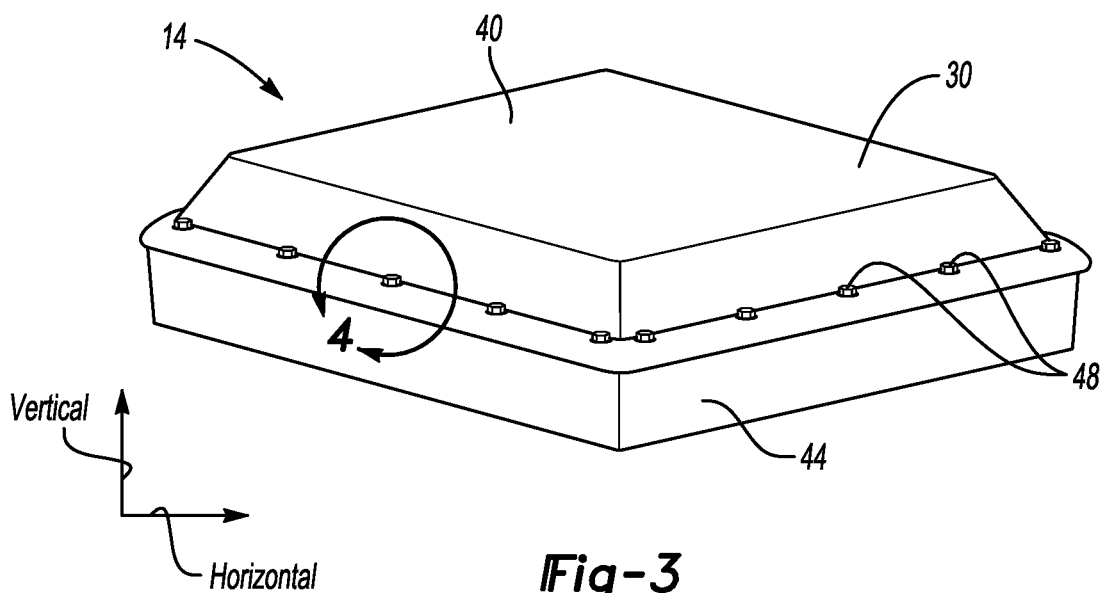
FIG. 3 illustrates the battery pack of FIG. 2 when assembled.
Figure 4:
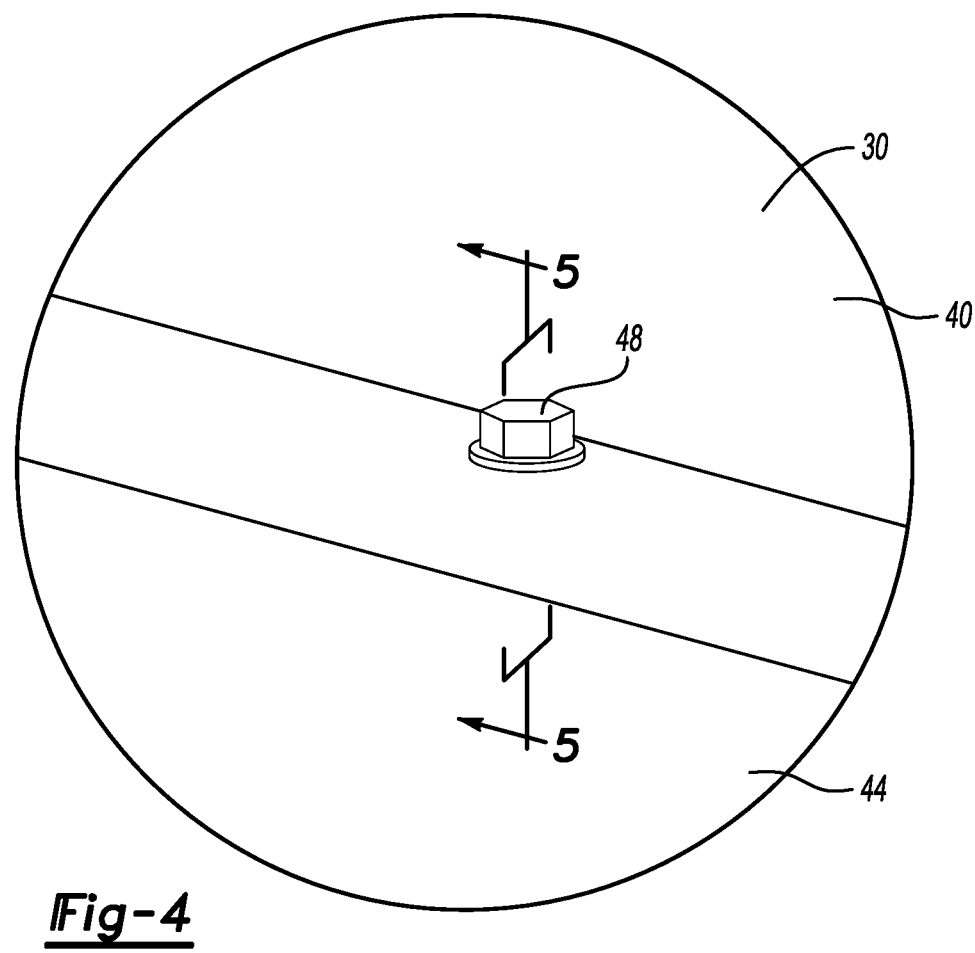
FIG. 4 illustrates a close-up view of Area 4 in FIG. 3.

With reference now to FIGS. 2-4, the battery pack 14 includes an enclosure 30 providing an interior area 32 that holds at least one array 36 of individual battery cells. The interior area 32 can hold other components of the battery pack 14, such as electronic components, control modules, etc.

The enclosure 30 includes a plurality of pieces. In the exemplary embodiment, one of the enclosure pieces is an enclosure cover 40 and another of the pieces is an enclosure tray 44. In this example, threaded mechanical fasteners 48 secure the cover 40 to the tray 44 to enclose the arrays 36 within the interior area 32. Although the exemplary enclosure 30 includes two pieces (i.e., the cover 40 and the tray 44) secured together to enclose the interior area 32, other enclosures could include other numbers of pieces.

In the exemplary embodiment, the tray 44 is cast aluminum and the cover 40 is stamped aluminum. In another example, the tray 44, the cover 40, or both, are made of another material. The exemplary tray 44 and cover 40 are not electrocoated. In another example, the tray 44 is not electrocoated, but the cover 40 is electrocoated.

Figure 5:
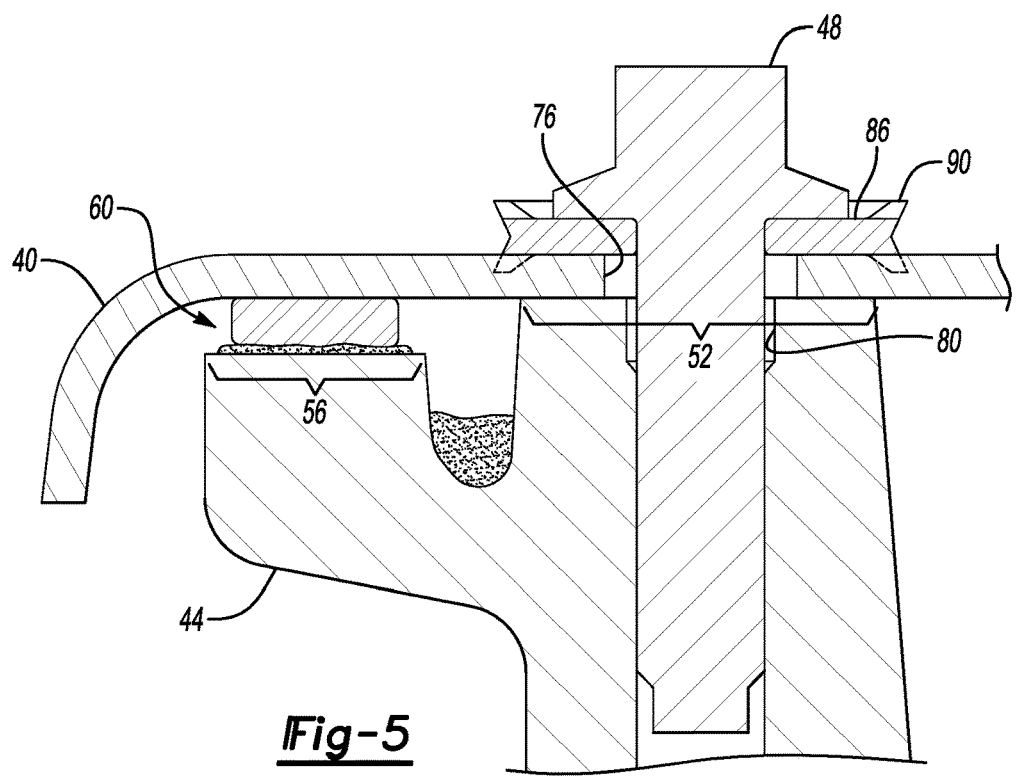
FIG. 5 illustrates a section view taken at line 5-5 in FIG. 4.
Figure 6:
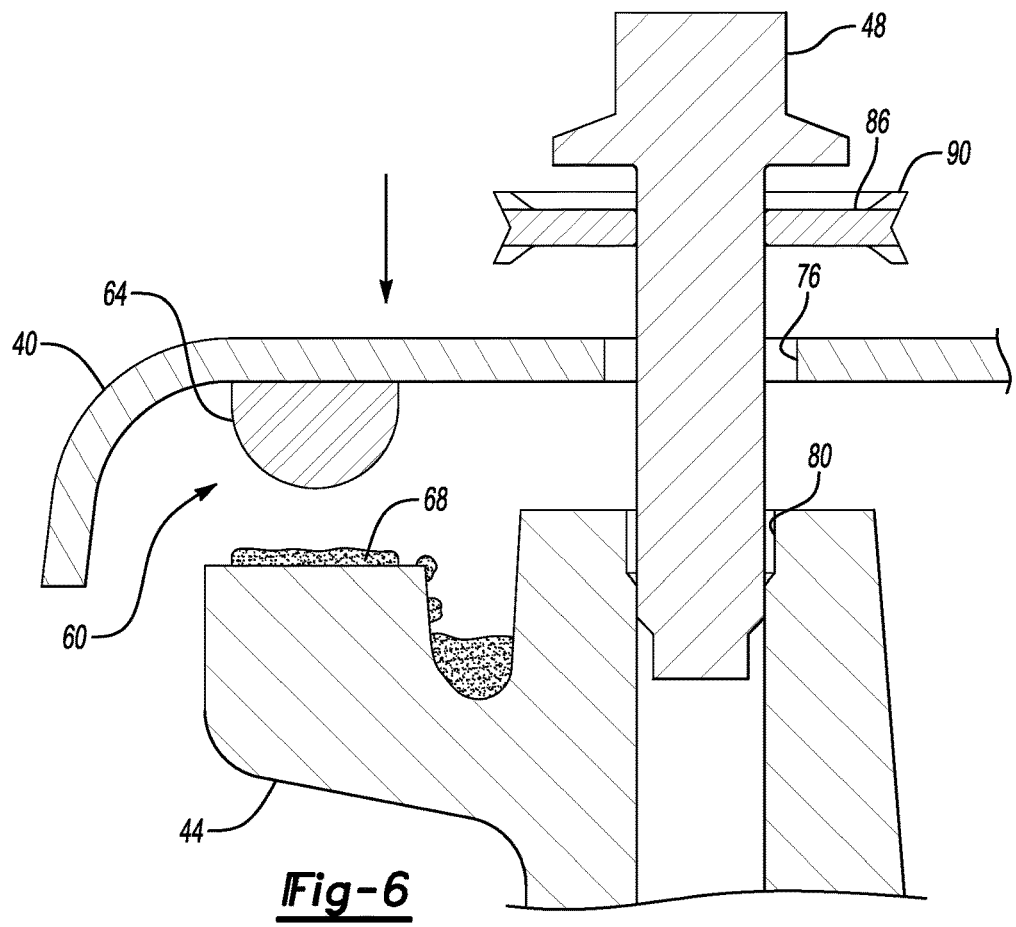
FIG. 6 illustrates the section view of FIG. 5 when assembling an enclosure of the battery pack.

With reference now to FIGS. 5 and 6 with continuing reference to FIGS. 2-4, the mechanical fasteners 48 clamp together the cover 40 and the tray 44. The mechanical fasteners 48 extend vertically through a fastening interface 52 to clamp together the cover 40 and the tray 44. The fastening interface 52 is annular and encircles the interior area 32. Vertical and horizontal, for purposes of this disclosure, is with reference to the typically orientation of the battery pack 14 when installed within a vehicle and with reference to ground.

The battery pack 14 includes sealing interface 56 is outside the fastening interface 52 and the fasteners 48. The sealing interface 56 includes a sealing system that seals the cover 40 against the tray 44 to prevent moisture and contaminants from moving between the interior area 32 and areas outside the battery pack 14.

A seal system 60 is disposed within the sealing interface 56. The seal system includes a cured gasket 64 and a non-setting sealant 68. The cured gasket 64 substantially blocks moisture and contaminants from moving between the interior area 32 and an area outside the battery pack 14. The non-setting sealant 68 helps to prevent corrosion of the metal or metal alloy components of the battery pack 14. In this example, the non-setting sealant 68 helps to prevent corrosion of the cover 40, the tray 44, or both.

When the seal system 60 is provided the sealing interface 56, cured gasket 64 and the non-setting sealant 68 are compressed against each other between the cover 40 and the tray 44. The compressing is at a position outside the fastening interface 52.

The cured gasket 64 is, in this example, a cure-in-place gasket. The cured gasket 64 can be dispensed as a bead on the cover 40. The bead can cure and bond to the cover 40 prior to assembling the cover 40 to the tray 44. The bead can be a continuous loop. When the tray 44 and the cover 40 are assembled, the cured gasket 64 completely encircles the fastening interface 52

The non-setting sealant 68 can be a grease-like substance. The non-setting sealant 68 can be applied to the tray 44 prior to assembling the cover 40 to the tray 44.

Situated between the sealing interface 56 and the fastening interface 52 is a sealant collection channel 72. Excess of the non-setting sealant 68 can drip into the sealant collection channel 72 rather than flow to the fastening interface 52. The sealant collection channel 72 is an annular groove in the tray 44 in this example.

The sealing interface 56, the fastening interface 52, and the sealant collection channel 72 are each circumferentially continuous and completely encircle the interior area 32.

When the cover 40 is secured to the tray 44 in the exemplary embodiment, the mechanical fasteners 48 extend through apertures 76 in the cover 40 to engage threaded bores 80 within the tray 44. A fastener seal 86 is used to seal the apertures 76 in this example.

The mechanical fastener 48 can be a bolt and the fastener seal 86 a washer seal. When the mechanical fastener 48 is torqued down, polymer-based rings 90 of the fastener seal 86 are pressed against the outer surface of the tray 44 to provide a seal.

An enclosure securing method for the enclosure 30 can include joining together first and second enclosure pieces of the enclosure 50 at the fastening interface 52. Here, the pieces are joined using the fasteners 48, which extend through the fastening interface 52.

During the joining, the cured gasket 64 is pressed between the first and second enclosure pieces, and is compressed against the non-setting sealant 68 to provide the sealing interface 56. The sealing interface 56 is outside the fastening interface 52 relative to the interior area 32 of the enclosure 30.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:
1. A battery enclosure assembly, comprising:
first and second pieces of an enclosure having an interior area;
a plurality of fasteners joining the first and second pieces at a fastening interface; and
a seal system sealing the first and second pieces at a sealing interface that is outside the plurality of fasteners relative to the interior area, the seal system including a cured gasket and a non-setting sealant, the second piece providing a sealant collection channel that is disposed between the sealing interface and the fastening interface.

2. The battery enclosure assembly of claim 1, further comprising at least one array of battery cells disposed within the interior area.

3. The battery enclosure assembly of claim 1, wherein the cured gasket is a cure-in-place gasket.

4. The battery enclosure assembly of claim 1, wherein the cured gasket is bonded to the first piece and compressed against the second piece.

5. The battery enclosure assembly of claim 4, wherein the first piece is an enclosure cover of a battery enclosure, and the second piece is an enclosure tray of the battery enclosure.

6. The battery enclosure assembly of claim 1, wherein the fastening interface and the sealing interface each extend circumferentially continuously about the interior area such that the fastening interface and the sealing interface each completely encircle the interior area.

7. The battery enclosure assembly of claim 1, wherein the cured gasket completely encircles the fastening interface.

8. The battery enclosure assembly of claim 1, further comprising a plurality of fastener seals, each fastener within the plurality of fasteners extending through one of the plurality of fastener seals.

9. The battery enclosure assembly of claim 8, wherein the fastener seals are washer seals.

10. The battery enclosure assembly of claim 1, wherein the plurality of fasteners extend through the fastening interface.

11. The battery enclosure assembly of claim 1, wherein the first piece, the second piece, or both are a metal or metal alloy.

12. A battery enclosure assembly, comprising:
first and second pieces of an enclosure having an interior area, the first piece is an enclosure cover of a battery enclosure, and the second piece is an enclosure tray of the battery enclosure;
a plurality of fasteners joining the first and second pieces at a fastening interface; and
a seal system sealing the first and second pieces at a sealing interface that is outside the plurality of fasteners relative to the interior area, the seal system including a cured gasket and a non-setting sealant, the cured gasket bonded to the first piece and compressed against the second piece; and
a sealant collection channel provided within the tray, the sealant collection channel disposed between the sealing interface and the fastening interface.

13. The battery enclosure assembly of claim 12, wherein the non-setting sealant is applied to the enclosure tray.

14. An enclosure securing method, comprising:
joining together first and second enclosure pieces of an enclosure at a fastening interface using a plurality of fasteners that extend through the fastening interface; and
during the joining, compressing a cured gasket between the first and second enclosure pieces, the cured gasket compressed against a non-setting sealant to provide a sealing interface, the sealing interface outside the fastening interface relative to an interior area of the enclosure; and
holding some of the non-setting sealant within a sealant collection channel that is between the fastening interface and the sealing interface.

15. The enclosure securing method of claim 14, wherein the compressing is at a position outside of the fastening interface relative to the interior area.

16. The enclosure securing method of claim 14, further comprising encircling the interior area with the cured gasket.

17. The enclosure securing method of claim 14, further comprising curing the cured gasket in place on one of the first or second enclosure piece.

18. The enclosure securing method of claim 14, further comprising holding at least one array of battery cells within the interior area.

* * * * *